March 30, 1954 P. R. FERGUSON 2,673,367
DOOR-CHECK

Filed March 8, 1951 2 Sheets-Sheet 1

INVENTOR
Paul R. Ferguson
by Robert Irving Williams
ATTORNEY

March 30, 1954 P. R. FERGUSON 2,673,367
DOOR-CHECK
Filed March 8, 1951 2 Sheets-Sheet 2
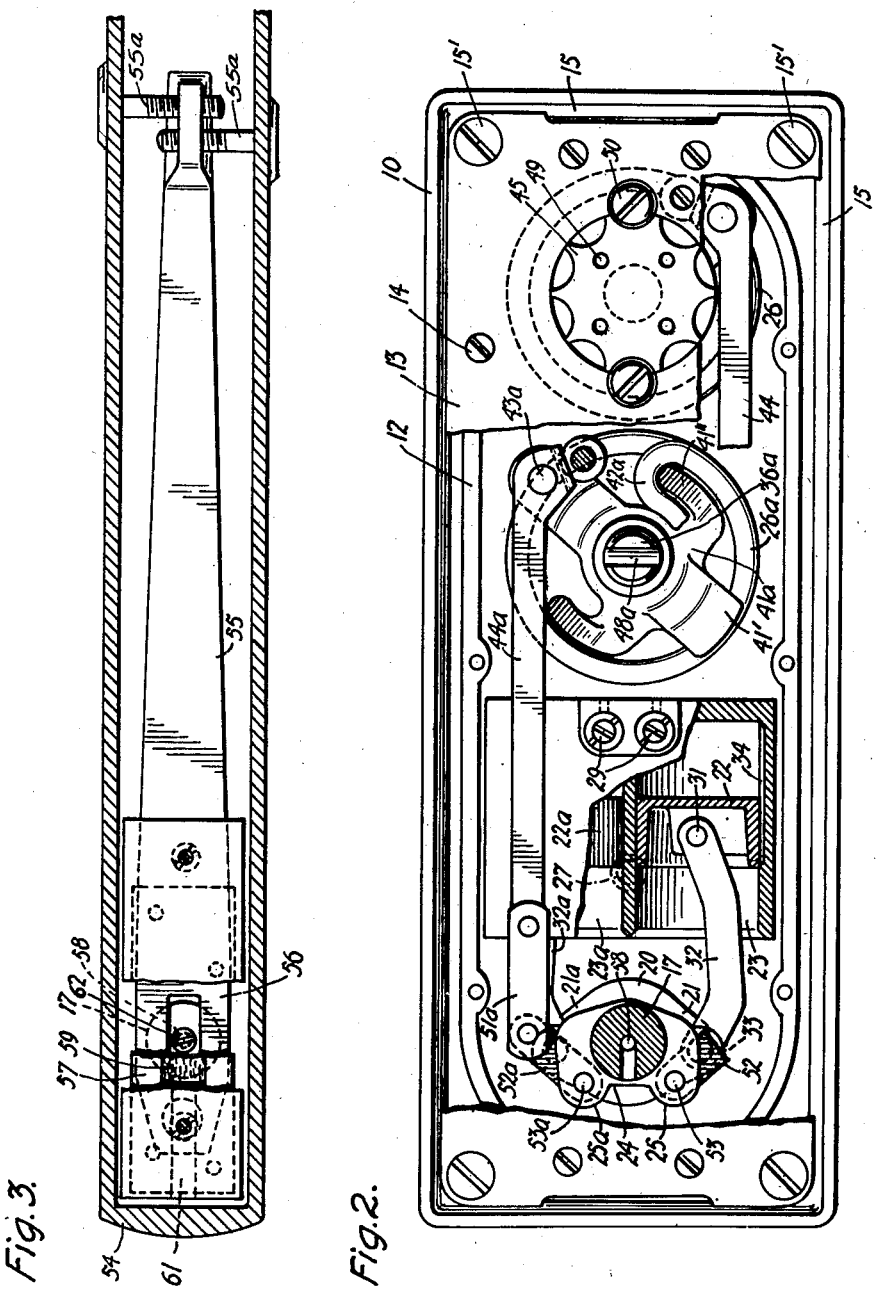
INVENTOR
Paul R. Ferguson
by Robert Irving Williams
ATTORNEY Patented Mar. 30, 1954

2,673,367

UNITED STATES PATENT OFFICE 2,673,367

DOOR CHECK

Paul R. Ferguson, Union, N. J., assignor to The Stanley Works, New Britain, Conn., a corporation Application March 8, 1951, Serial No. 214,505

2 Claims. (Cl. 16—55)

This invention relates to a double acting floor check.

Mechanisms of this type customarily have the operating mechanism, including a plunger type check cylinder immersed in oil, contained in a casing embedded in the floor below the sill, the oil serving to lubricate the parts and serving as the fluid for the check cylinder as well.

Difficulty has been experienced with such checks by reason of extrusion of oil through the cracks surrounding the various rotating parts, set screws, adjusting screws and such like that have to pass through the chamber walls.

It is an object of this invention to provide an improved floor check of the character described in which these difficulties may be avoided, so that the check may remain in operation for long periods of time without attention and without losing its oil or soiling the floor by oil seepage.

This invention accordingly comprises a device possessing the features, properties and the relation of elements which will be exemplified in the device hereinafter described and the scope of the application of which will be indicated in the claims.

For a fuller understanding of the nature and objects of the invention, reference should be had to the following detailed description taken in connection with the accompanying drawings, in which:

Fig. 2 is a horizontal section on line 2—2 of Fig. 1 with parts broken away to show the lever mechanism; and Fig. 3 is a section on the lines 3—3 of Fig. 1 showing a top view of the upper parts of the device.

Figure 1:
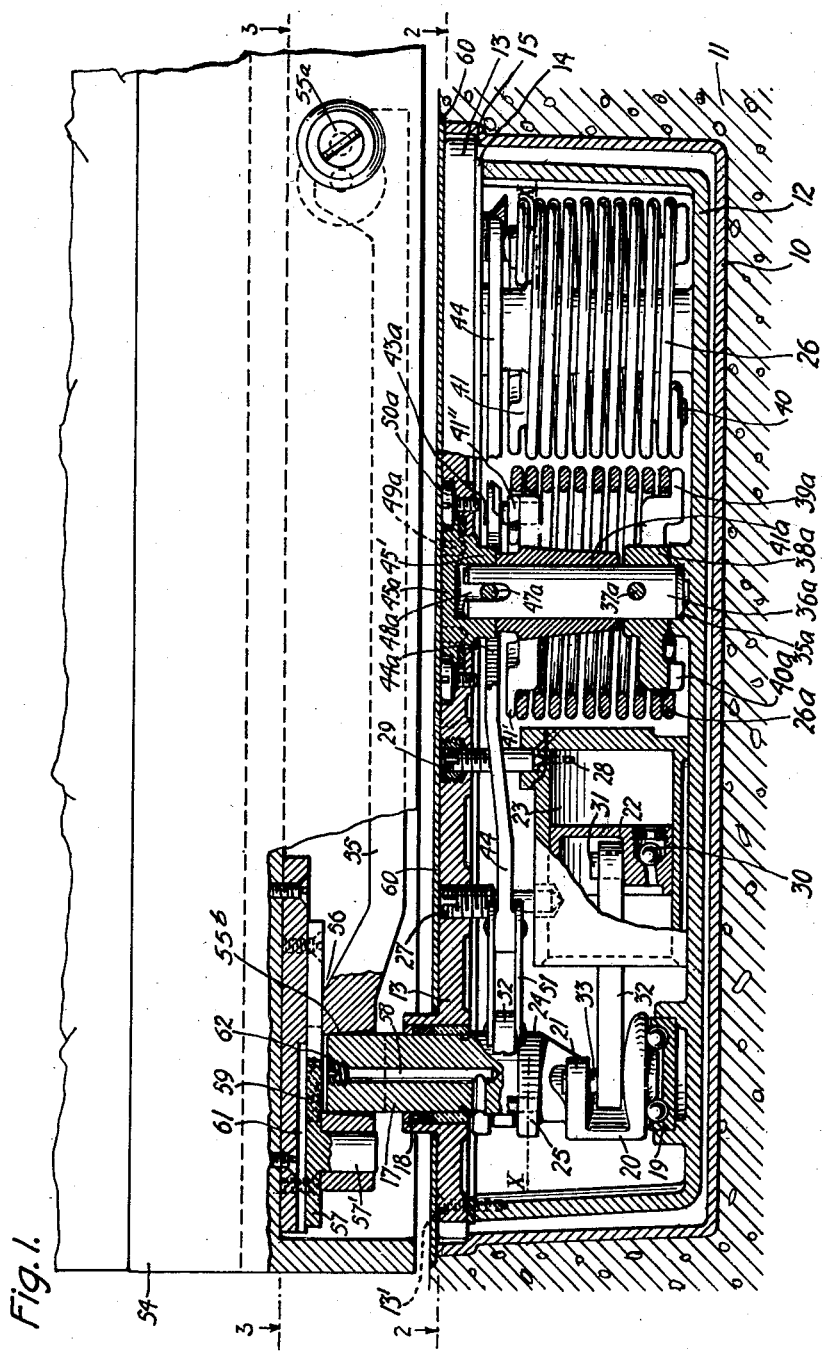
Figure 1 is a vertical section through a mechanism embodying this invention.

In the drawings, the numeral 10 represents a recess box adapted to be set in the floor 11 beneath a door sill. All of the check mechanism is carried in an enclosure which fits within this recess box. This enclosure comprises a case 12 and a cover 13 which are held in oil tight relation to each other by suitable screws 13' and a gasket 14. The cover projects beyond the case and is held in against a flange 15 in the recess box by screws 15'. The operating mechanism is carried by the bottom and cover of the casing 12.

A post 17 is journaled at 18 on a vertical axis in the cover 13, having a portion extending above the cover to engage the door, and a portion extending down into the box resting on a ball thrust bearing 19 in the bottom of the box. The post 17 is provided at its lower end with a double ended crank member 20 providing thus two oppositely extending crank arms 21 and 21a, each connected to operate a piston 22 or 22a in a cylinder 23 or 23a.

Above the crank member 20 on post 17 is another crank member 24 which provides two divergent crank arms 25 and 25a which are connected to operate a spring 26 or 26a.

Cylinders 23 and 23a are alike and are similarly connected to their respective crank arms. The cylinders are held in place within the case by a hold down screw 27. One end of the cylinder 23 is open to receive the piston 22, while the other is closed except for a bleeder opening 28 controllably throttled by a screw 29.

Piston 22 has a bell check valve 30 arranged to admit oil through the piston into the cylinder. It has also a pin 31 upon which is pivoted one end of a link 32, the other end of which is connected by a pin 33 with arm 21, crank arm 21a being similarly connected to a piston 22a by link 32a, so that as crank member 20 is turned in either direction one piston 22 or 22a will be pulled out of its cylinder and the other will be pushed in. This resistance to opening, however, will not be objectionable because of by-pass 34 extending from the outer edge of each piston when at center position to the bottom (rear) of each cylinder.

Springs 26 and 26a are identical and are similarly connected to crank arms 25 and 25a. Mounted in a recess 35a in the bottom of the case is a post 36a, upon which is pinned by a pin 37a the spring carrier 38a having a flange 39a on which spring 26a may rest and having a raised hook member 40a with which one end of the spring may be engaged. Rotatably mounted on post 36a above carrier 38a is another carrier 41a having a flange 41' and a raised finger 41" engaging the other hooked end 42a on the spring 26a. This upper spring carrier 41a has a pin 43a extending upwardly to engage a bearing in a link 44a for spring 26a, and is otherwise free to rotate about post 36a.

Rotatably mounted in the cover is a disc 45a forming a spring adjuster. This adjuster 45a has a downwardly extending hub 45' surrounding post 36a and carrying a horizontal pin 47a fitting into a slot 48a in the top of post 36a. Spring adjuster 45 has a similar construction, the corresponding parts of which are designated by corresponding reference numerals from which the subscript "a" has been omitted. The spring adjusters may be turned by a tool fitting into holes 49 and 49a respectively in the discs to wind the springs and it may be held in any adjusted position by screws 50 and 50a respectively fitting into scallops in the periphery of the discs and threaded into the annular shoulders on which discs 45 and 45a are supported.

Link 44a is connected by links 51a and 52a with pin 53a on crank 24. A link 44 is similarly connected between springs 26 and pin 53 on arm 25 by links 5 and 52.

The case is filled with lubricating oil up to the level indicated by line X—X which is sufficient to cover all the internal operating mechanism.

Mounted within a recess in the bottom face of the door is a plate 57 carrying a downwardly extending post 57'. An arm 55 is also mounted within said recess, being pivoted at its rear end on said post 57' and having its forward end adjustably connected to the faces of the doors by adjusting screws 55a. This arm 55 carries, adjacent to the post 57', a socket 55b to provide a driving connection with a pivot post 17.

It will be seen that the spring adjusting screws 50 and 50a, the spring adjusters 45 and 45a, the cylinder hold-down screws 27, the valve screws 29 and the post 17 all extend through the top cover 13. Although all these holes are made as tight as practical, nevertheless oil seepage takes place when the device gets warm due to the expansion of the air in the casing. This results in soiling the floor with oil and also results in loss of oil.

To avoid this difficulty, according to this invention, the oil level is maintained low enough as shown at X—X to provide an air pocket within the casing and there is provided a bore or vent 58 within the post 17, the lower end of which communicates with the air pocket above the oil level, and the upper end being open. The plate 57 is provided with an air vent to communicate with bore 58 here shown as a vertical opening 59 from the top of the socket 55c communicating with a lateral vent opening 6. If desired, an air filter may be inserted as, for example, in opening 59 to prevent dust from entering. Such tendencies are, however, minimized by the fact that the upper opening of the vent is immediately beneath the door edge. The casing and recess box are covered by a floor plate 63. During shipment the open end of bore 58 is closed with a plug 62, but during installation this is removed and the bore is open to atmosphere.

With this construction, as the oil and air expand due to rising temperature no pressure is developed which might force oil up around the screws, because the air is free to escape through the vent. To accomplish this result, however, it is essential that the lower end of the vent be above the oil level and it is important that the vent be concentric with the axis of the door, and closed by the door, except for the filter, in order that the oil can be kept clean.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. A floor check for a door, comprising in combination a casing, spring mechanism and checking mechanism contained within said casing for connection to the underside of the door, a post extending upwardly from said casing for connection to the under side of the door, said post being connected to operate said spring and checking mechanism, said casing being sealed tightly against the loss of liquid, said casing being filled with liquid to a point above the level of said mechanism, leaving an air space above it, said post having a vertical bore through its upper end connected with said air space, a plate adapted to be fastened upon the bottom of the door within a recess therein, and having a downwardly extending stud adjacent to the axis of hinging of the door, an arm hinged upon said stud having a vertical socket to receive the post in driving relation thereto, said arm having an extension provided with adjusting means for engaging the door, and an air vent communicating with the interior of said casing and extending from said socket above the post to the atmosphere.

2. A floor check as set forth in claim 1 in which the air vent comprises a vertical hole part way through the plate above the post and having a filter therein, and a laterally extending opening extending out from the other side of the filter.

PAUL R. FERGUSON.

References Cited in the file of this patent

UNITED STATES PATENTS

| Number | Name | Date |
|---|---|---|
| 2,116,185 | Bernhard | May 3, 1938 |
| 2,549,611 | Kunzl | Apr. 17, 1951 |
| 2,550,756 | Bartoszek | May 1, 1951 |

FOREIGN PATENTS

| Number | Country | Date |
|---|---|---|
| 500,134 | Great Britain | Feb. 3, 1939 |